(12) United States Patent
Barber et al.

(10) Patent No.: US 12,701,442 B2
(45) Date of Patent: Aug. 4, 2026

(54) METHODS AND SYSTEMS AUTOMATICALLY IMPLEMENTING RESETS IN A NETWORK BASED ON NETWORK IMPACT AND AN ASSOCIATED TIME

(71) Applicant: T-Mobile Innovations LLC, Overland Park, KS (US)

(72) Inventors: Eric A. Barber, Grand Ledge, MI (US); William B. Durrough, Harrison, OH (US); Brian D. Lushear, Winter Springs, FL (US); Julie A. Springer, Kansas City, MO (US)

(73) Assignee: T-Mobile Innovations LLC, Overland Park, KS (US)

( * ) Notice: Subject to any disclaimer, the term of this patent is extended or adjusted under 35 U.S.C. 154(b) by 286 days.

(21) Appl. No.: 18/651,407

(22) Filed: Apr. 30, 2024

(65) Prior Publication Data

US 2025/0338150 A1 Oct. 30, 2025

(51) Int. Cl.
*H04W 24/04* (2009.01)
*H04W 24/08* (2009.01)

(52) U.S. Cl.
CPC ........... *H04W 24/04* (2013.01); *H04W 24/08* (2013.01)

(58) Field of Classification Search
CPC ...... H04W 24/04; H04W 24/08; H04W 24/02
USPC ....................................................... 455/420
See application file for complete search history.

(56) References Cited

U.S. PATENT DOCUMENTS

| | | | | |
|---|---|---|---|---|
| 10,405,223 | B1 * | 9/2019 | Douberley | ............ H04W 24/10 |
| 12,457,513 | B2 * | 10/2025 | Conyers | ................ H04W 24/08 |
| 12,580,807 | B2 * | 3/2026 | Su | ........................ H04L 41/0631 |
| 2003/0191979 | A1 | 10/2003 | Whitten et al. | |
| 2006/0233312 | A1 | 10/2006 | Adams et al. | |
| 2011/0083043 | A1 | 4/2011 | Chan | |
| 2013/0205007 | A1 | 8/2013 | Ayachitula et al. | |
| 2018/0174067 | A1 | 6/2018 | Spiro et al. | |
| 2021/0397497 | A1 * | 12/2021 | Tiwari | .................... G06N 20/00 |

(Continued)

FOREIGN PATENT DOCUMENTS

CN 114205832 A * 3/2022 ............ H04W 16/22

OTHER PUBLICATIONS

Alexios Lekidis et al. (Towards Incident Response Orchestration and Automation for the Advanced Metering Infrastructure; IEEE; Apr. 17, 2024) (Year: 2024).*

(Continued)

*Primary Examiner* — Hirdepal Singh

(57) ABSTRACT

An incident management system comprises a reset application and a network impact application. The network impact application is configured to determine a reset time at which to perform a reset at the network element based on a network impact rule, wherein the network impact rule indicates an optimal time to perform the reset at the network element based on a load at the network element at various times, and compare a network impact level of the incident at the network element with a network impact level of performing the reset at the network element. When the network impact level of the incident at the network element is less than the network impact level of performing the reset at the network element, the reset application is configured to determine a second reset to perform at the network element in an attempt to resolve the incident.

20 Claims, 10 Drawing Sheets

(56)        References Cited

U.S. PATENT DOCUMENTS

| | | | |
|---|---|---|---|
| 2022/0100182 A1 | 3/2022 | Mehrotra et al. | |
| 2023/0116748 A1 | 4/2023 | Rowe et al. | |
| 2023/0396485 A1* | 12/2023 | Wang .................... | H04W 24/04 |
| 2025/0021422 A1 | 1/2025 | Anand et al. | |
| 2025/0056259 A1 | 2/2025 | Gonzalez et al. | |
| 2025/0240651 A1 | 7/2025 | Andrews et al. | |
| 2025/0280309 A1 | 9/2025 | Proctor | |
| 2025/0286796 A1* | 9/2025 | Báder ................... | H04L 43/062 |
| 2026/0052433 A1* | 2/2026 | Nayak ................... | H04W 24/02 |

OTHER PUBLICATIONS

Durrough, William B., et al., "Methods and Systems for Automatically Implementing Resets in a Network Based on Network Impact", filed Apr. 19, 2024, U.S. Appl. No. 18/641,179.
Notice of Allowance dated Mar. 31, 2026, U.S. Appl. No. 18/641,179, filed Apr. 19, 2024.

* cited by examiner

158

265

Figure 3:
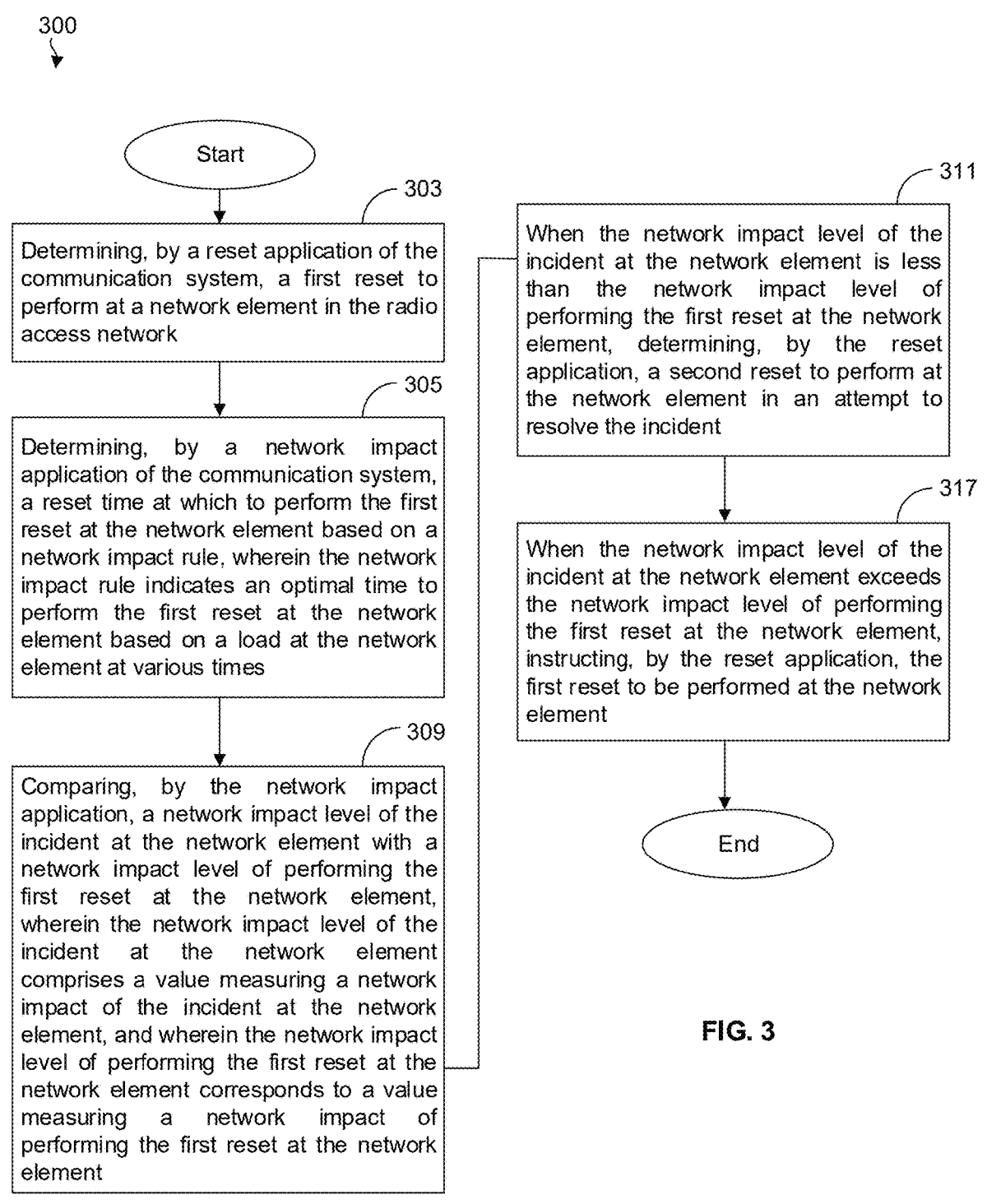

300

Start

303

Determining, by a reset application of the communication system, a first reset to perform at a network element in the radio access network

305

Determining, by a network impact application of the communication system, a reset time at which to perform the first reset at the network element based on a network impact rule, wherein the network impact rule indicates an optimal time to perform the first reset at the network element based on a load at the network element at various times

309

Comparing, by the network impact application, a network impact level of the incident at the network element with a network impact level of performing the first reset at the network element, wherein the network impact level of the incident at the network element comprises a value measuring a network impact of the incident at the network element, and wherein the network impact level of performing the first reset at the network element corresponds to a value measuring a network impact of performing the first reset at the network element

311

When the network impact level of the incident at the network element is less than the network impact level of performing the first reset at the network element, determining, by the reset application, a second reset to perform at the network element in an attempt to resolve the incident

317

When the network impact level of the incident at the network element exceeds the network impact level of performing the first reset at the network element, instructing, by the reset application, the first reset to be performed at the network element End

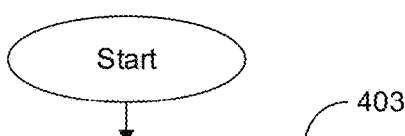

Start

403

Determining, by a reset application of the communication system, a reset to perform at a network element in the radio access network, wherein the reset is associated with a first confidence score indicating a first likelihood that the reset will resolve an incident at the network element

405

Determining, by a network impact application of the communication system, a reset time at which to perform the reset at the network element based on a network impact rule, wherein the network impact rule indicates an optimal time to perform the reset at the network element based on a load at the network element at various times

409

Comparing, by the network impact application, a network impact level of the incident at the network element with a network impact level of performing the reset at the network element, wherein the network impact level of the incident at the network element comprises a value measuring a network impact of the incident at the network element, and wherein the network impact level of performing the reset at the network element corresponds to a value measuring a network impact of performing the reset at the network element

411

When the network impact level of the incident at the network element is less than the network impact level of performing the reset at the network element, determining, by the reset application, a second reset to perform at the network element in an attempt to resolve the incident, wherein the second reset is associated with a second confidence score indicating a second likelihood that the second reset will resolve the incident at the network element

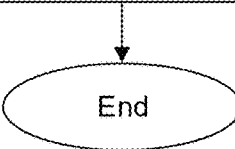

End

FIG. 4

METHODS AND SYSTEMS AUTOMATICALLY IMPLEMENTING RESETS IN A NETWORK BASED ON NETWORK IMPACT AND AN ASSOCIATED TIME

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix NEs. Operational support systems (OSSs) may be provided by vendors of NEs to monitor and maintain their products. When trouble occurs in NEs, the OSS and/or the NEs may generate an alarm notification. An incident management system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a method for automatically implementing resets in a radio access network of a communication network is disclosed. The method comprises determining, by a reset application of the communication network, a first reset to perform at a network element in the radio access network, and determining, by a network impact application of the communication network, a reset time at which to perform the first reset at the network element based on a network impact rule, wherein the network impact rule indicates an optimal time to perform the first reset at the network element based on a load at the network element at various times. The method further comprises comparing, by the network impact application, a network impact level of an incident at the network element with a network impact level of performing the first reset at the network element, wherein the network impact level of the incident at the network element comprises a value measuring a network impact of the incident at the network element, and wherein the network impact level of performing the first reset at the network element corresponds to a value measuring a network impact of performing the first reset at the network element. When the network impact level of the incident at the network element is less than the network impact level of performing the first reset at the network element, the method further comprises determining, by the reset application, a second reset to perform at the network element in an attempt to resolve the incident. When the network impact level of the incident at the network element exceeds the network impact level of performing the first reset at the network element, the method further comprises instructing, by the reset application, the first reset to be performed at the network element.

In another embodiment, a method for automatically implementing resets in a radio access network of a communication network is disclosed. The method comprises a method for automatically implementing resets in a radio access network of a communication network, wherein the method comprises determining, by a reset application of the communication network, a reset to perform at a network element in the radio access network, wherein the reset is associated with a first confidence score indicating a first likelihood that the reset will resolve an incident at the network element. The method further comprises determining, by a network impact application of the communication network, a reset time at which to perform the reset at the network element based on a network impact rule, wherein the network impact rule indicates an optimal time to perform the reset at the network element based on a load at the network element at various times. The method further comprises comparing, by the network impact application, a network impact level of the incident at the network element with a network impact level of performing the reset at the network element, wherein the network impact level of the incident at the network element comprises a value measuring a network impact of the incident at the network element, and wherein the network impact level of performing the reset at the network element corresponds to a value measuring a network impact of performing the reset at the network element, and when the network impact level of the incident at the network element is less than the network impact level of performing the reset at the network element, determining, by the reset application, a second reset to perform at the network element in an attempt to resolve the incident, wherein the second reset is associated with a second confidence score indicating a second likelihood that the second reset will resolve the incident at the network element.

In yet another embodiment, a communication network is disclosed. The communication network comprises a radio access network comprising a network element, one or more non-transitory memories, one or more processors, a reset application stored at the one or more non-transitory memories, and a network impact application stored at the one or more non-transitory memories. The reset application causes the one or more processors to be configured to determine a reset to perform at the network element, wherein the reset is associated with a first confidence score indicating a first likelihood that the reset will resolve an incident at the network element. The network impact application causes the one or more processors to be configured to determine a reset time at which to perform the reset at the network element based on a network impact rule, wherein the network impact rule indicates an optimal time to perform the reset at the network element based on a load at the network element at various times, and compare a network impact level of the incident at the network element with a network impact level of performing the reset at the network element, wherein the network impact level of the incident at the network element comprises a value measuring a network impact of the incident at the network element, and wherein network impact level of performing the reset at the network element corresponds to a value measuring a network impact of performing the reset at the network element. Wherein the reset application further causes the one or more processors to be configured to determine a second reset to perform at the network element in an attempt to resolve the incident when the network impact level of the incident at the network element is less than the network impact level of performing the reset at the network element, wherein the second reset to is associated with a second confidence score indicating a second likelihood that the second reset to will resolve the incident at the network element.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flowchart of a method performed in the communication network according to an embodiment of the disclosure.

FIG. 4 is a flowchart of another method according to an embodiment of the disclosure.

DETAILED DESCRIPTION

Figure 1:
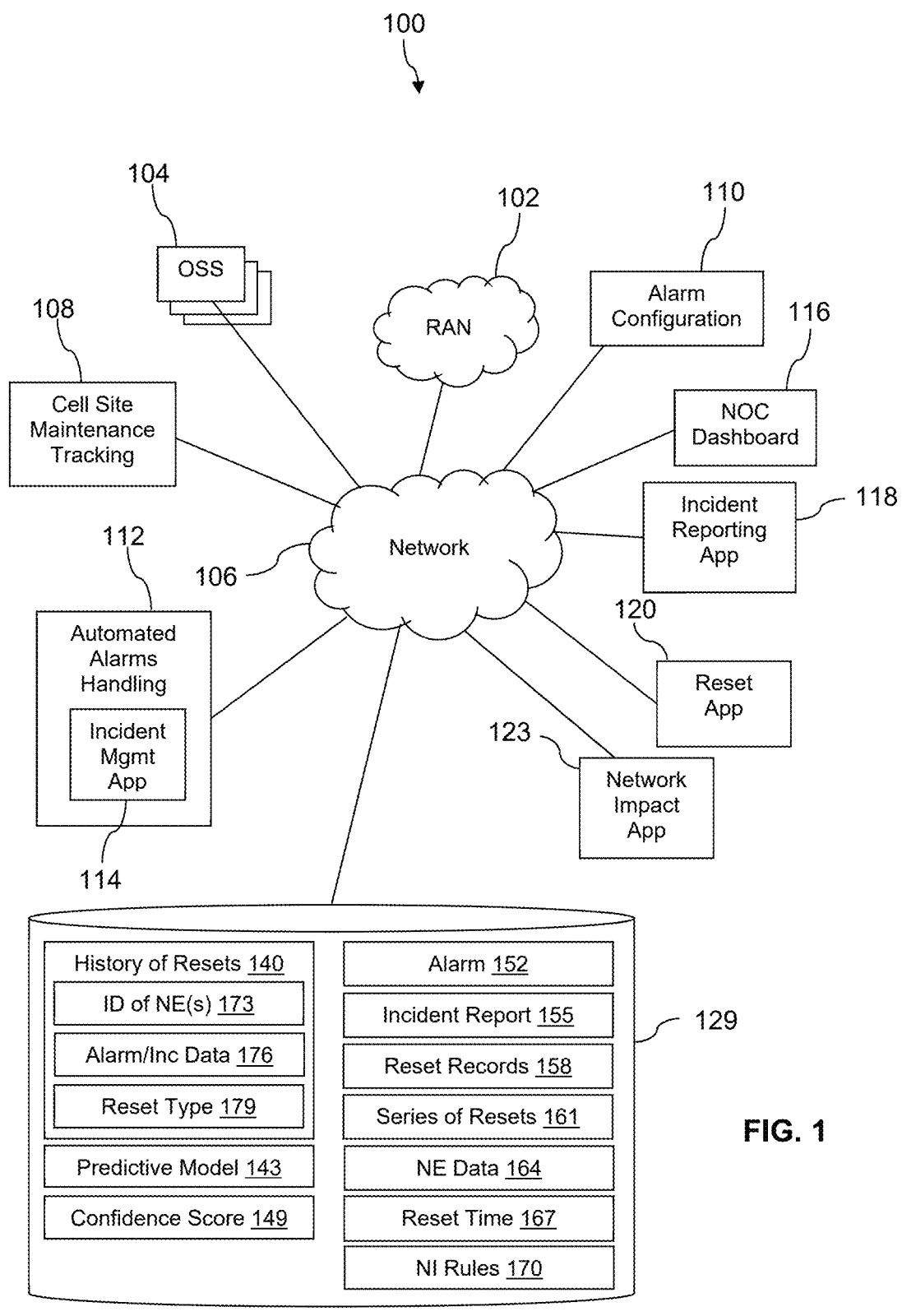
FIG. 1 is a block diagram of a communication network configured to automatically implement resets according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communications network may include one or more radio access networks (RANs), each including network elements (NEs) used to transport traffic between a source and destination. The NEs may include, for example, routers, virtual private networks (VPNs), cell sites, towers, macro/micro cells, etc. The communication network may also include the incident management system that creates and tracks incident reports to resolve incidents occurring at the NEs. The incident management system may include, for example, one or more OSSs, central monitoring station(s), an incident reporting application, an incident management application, and/or an automated system, that work together to monitor and resolve hardware and software incidents (e.g., failures and faults) that may occur at the NEs in the system. For example, different types of incidents may occur at each of the NEs, and the different types of incidents may trigger alarms that are forwarded to the OSS, and then propagated to an incident reporting application.

The incident reporting application may be responsible for automatically or manually generating an incident report detailing the incident that caused the alarm. The incident reporting application may create the incident report and send the incident report to an incident management application, which may be responsible for triaging the incident report and ensuring that the incident report is sent to the proper entity for resolution. The entity responsible for resolving the incident may be the automated system, a maintenance technician, or a NOC operator operating a NOC workstation. The automated system may receive an instruction from the incident management system to programmatically perform certain steps in an attempt to resolve or remediate the incident described in the incident report.

For example, NEs such as cell sites in a RAN may be susceptible to different types of incidents caused by hardware and software issues, failures, or problems. The NEs in the RAN, or an application communicatively coupled to the NEs, may be programmed to detect these incidents or conditions leading up to these incidents and trigger an alarm accordingly. The incident reporting application may generate the incident report in response to receiving the alarm based on the incident that triggered the alarm. The incident management application may forward the incident report to the entity, such that the entity may perform the steps to attempt to resolve the incident. As used herein, the term "resolution" or "resolved" may refer to the process of correcting or remediating the underlying incident that triggered the alarm and closing the incident or incident report.

In some cases, certain types of incidents may be resolved by resetting the software or hardware at the NE. However, there are many different types of resets that may be performed at the NE for this purpose. For example, the resets may be equipment resets performed at the NE, such as a soft reset (e.g., involving restarting the NE or a component of the NE without removing power), a hard reset (e.g., completely cutting power to a NE/component and then restarting the NE/component), a factory reset (e.g., erasing all configurations at and restoring the NE to original manufactured state), a power cycle (e.g., turning the NE/component off, waiting a short period, and turning it back on), a software reset (e.g., using a specific command or function within the software of the NE/component to initiate a reset), a remote reset (e.g., initiating a reset operation on the NE/component from the NOC), etc. The resets may also be network-based resets, such as, for example, software unlocks/locks, radio resets, node/baseband resets, technology-related component resets, etc. It should be appreciated that the types of resets that is performed at the NE may be any type of reset and is otherwise not limited herein.

The different types of resets performed at an NE may each have a different network impact level. The network impact level may generally refer to the effect or consequence of performing a reset at the NE, and may encompass a broad range of outcomes that may affect the NE's performance, reliability, and overall functionality. For example, the network impact level may include an impact to the function of the NE, an impact to the services provided by the NE, an impact to a quantity of connections to and through the NE, an impact to the performance of the NE, an impact to the reliability of the NE, an impact to the security at the NE or offered by the NE, an impact to the user experience when connected to the NE, an impact to the operational efficiency of the network, etc. For example, the impact to the performance of the NE may relate to the data transfer speeds, latency, and overall responsiveness of the network. The impact to the reliability of the NE may be related to the uptime or downtime of the NE (e.g., a time of an outage at the NE due to the performance of the reset at the NE or a time of an increased latency at the NE due to the performance of the reset at the NE).

Each type of reset performed at an NE may be associated with a network impact level, in which resets with a low network impact level have a relatively minor network impact (e.g., only minor effects to the NE or network or may only affect a small number of users) while resets with a high network impact level have a relatively larger network impact (e.g., affecting multiple users connected to the NE, for an extended period of time). Nevertheless, the incident management system may perform resets in a largely inefficient and ineffective manner because resets are performed across NEs in the RAN without considering the network impact level of the reset.

As described herein and in the co-pending U.S. patent application Ser. No. 18/641,179, filed Apr. 19, 2024 by Eric A. Barber, et. al., which is hereby incorporated by reference in its entirety, methods and systems for automatically determining an optimal reset to perform at NEs in the RAN and maintaining consistent records regarding the resets performed at the RAN are provided. In these embodiments, a reset application in the incident reporting system may determine the optimal type of reset to perform at the NE based on a series of predetermined resets ordered according to network impact level, or using a predictive model.

However, once the optimal type of reset to perform at an NE is determined, there may be some instances in which performance of the reset still causes a relatively high network impact level. This may be because the different types of resets may have different network impact levels based on various other factors, such as, for example, a timing of performing the reset (also referred to herein as a "reset time"), interrelated components of the NE, recent maintenance events performed at the NE, etc. For example, the NE may have different network impact levels at different times of the day or week, the NE may have interconnected radio components such that a reset at one component affects the functioning of another component, a maintenance event may have recently been performed at the NE that may have not resolved an issue at the NE, etc. Therefore, after an optimal type of reset is determined to be performed, the reset may still have a high network impact level (e.g., cause an outage, experience increased latency, etc.) when the other factors affecting the network impact level of a reset are considered.

The present disclosure teaches a technical solution to the foregoing technical problem related to network operations and maintenance by taking additional actions with regard to the determined optimal reset based on the other factors that also heavily affect the network impact level of performing a reset. As further described herein, the methods and systems disclosed herein determine an optimal reset time at which to perform the reset at the NE based on a network impact rule used to determine the optimal time based on one or more factors (e.g., load on the network, architecture of the NE, etc.). The methods and systems disclosed herein also compare a network impact level of the incident being experienced at the NE with the network impact level of actually performing the reset at the NE, to determine whether to actually perform the reset or whether to determine another reset using the series of resets or the predictive model. By performing a reset based an optimal reset time and comparing the network impact level of the incident with the performance of the reset, the embodiments disclosed herein serve to reduce the overall network impact when performing the resets at the RAN. By reducing the overall network impact at the RAN, the embodiments disclosed herein conserve network capacity and reduce the load on the network, while providing the highest level of service to end-users.

The communication network implementing the incident management system includes the incident reporting application, the incident management application, the automated system, and the reset application, among other components, as described herein. In some embodiments, the incident management system may also include a network impact application. The network impact application may be implemented on a computer system in the communication network.

In an embodiment, the reset application may first identify a reset to perform at the NE using a series of predetermined resets or using the predictive model, as further described herein. Once the reset application has identified the reset, the network impact application may perform an extra layer of network impact comparisons and verifications on the reset, to ensure that the reset is performed during an optimal time window and to ensure that performing the reset itself does not cause more harm to the network than the incident by itself.

First, the network impact application may determine the reset time at which to perform the reset at the NE based on one or more network impact rules. The network impact rules may be stored at a data store accessible by the network impact application and may govern when and how to perform resets at different NEs in response to specific incident reports or alarms by considering the various factors that may affect the network impact level of performing a reset at the NE. For example, a factor considered in a network impact rule may be the current network load at the NEs at various times of the day, in which the network load at the NEs refers to, for example, a usage at the NE, a quantity of users connected to and through the NE, a quantity of services being provided by the NE, the throughput or bandwidth at the NE, etc. For example, a NE may have a large network load during daytime hours and a much lighter network load between 2 am and 5 am. Therefore, the network impact level of a reset performed at the NE during daytime hours may be much higher than the network impact level of the reset performed at the NE between 2 am and 5 am. In this case, the reset time to perform the reset may be set during the 2 am to 5 am time window, when the network load is the lightest at the NE. Alternatively, the NE may have a scheduled maintenance task to be performed at some point during the day, likely during a 10 pm to 5 am overnight time window. In this case, the reset time may be set during the time of the scheduled maintenance task, since the NE may already be in a maintenance window in which the NE is operating in an off or decreased service state.

Another factor that may be considered by the network impact rules for the NEs may be the architecture of the NEs, in which the architecture of the NEs may refer to the different types of equipment at the NEs, the interconnections and interrelations between radio components at the NEs, etc. For example, a reset that is performed at a first radio-related component may affect the operation of another radio-related component when the two radio-related components are interconnected or otherwise interrelated at the NE. In this case, the reset may have a higher than predicted network impact level, and the network impact application may determine the increase in network impact level based on the network impact at both of the related components. The network impact application may also determine the reset time to perform the reset based on the NE architecture. For example, the load at the second radio-related component may also be considered when determining the reset time since the second radio-related component may also be affected by the reset.

The network impact application may also determine to perform the reset or perform another reset based on comparing a network impact level of the incident at the NE with the network impact level of performing the reset at the NE. The network impact level of the incident at the NE may be a value measuring key metrics associated with a network impact of the incident at the NE. The key metrics may be based on various network attributes, such as for example, the performance, reliability, or security at the NE when the incident is occurring at the NE. To determine the network impact level of the incident at the NE, the network impact application may compare baseline metrics measuring network attributes (e.g., associated with the performance, reliability, or security) at the NE before the incident occurs at the NE with similar metrics measuring the network attributes at the NE while or after the incident occurs at the NE. The comparison may be used to determine deviations from the baseline metrics, and the deviations from the baseline metrics may indicate the network impact level of the incident at the NE. The values of each of these metrics may be obtained (e.g., received, determined, calculated, etc.) from a data store of historical metric data of the NE.

The network impact level of performing the reset at the NE may be a value measuring a network impact of performing the reset at the NE, which may also be based on certain metrics associated with an affect or outcome of performing the reset at the NE. For example, the metrics may again measure network attributes such as the performance, reliability, or security at the NE, which may occur at the result of performing the reset at the NE. To determine the network impact level of performing the reset at the NE, the network impact application may compare the current metrics of network attributes at the NE before the reset is performed at the NE with predicted (e.g., expected) metrics that may occur as a result of performing the reset at the NE. The comparison may be used to determine deviations from the current metrics, and the deviations from the current metrics may indicate the network impact level of performing the reset at the NE.

In some cases, the values of each of these metrics may be obtained (e.g., received, determined, calculated, etc.) from a data store storing historical metric data of the NE. In other cases, the values related to each of the metrics may also be obtained using the predictive model. For example, metric data describing metrics associated with NEs before and after resets are performed at the NEs may be input into the predictive model as training data (e.g., data points used to train the algorithms of the predictive model to accurately identify trends between resets performed at certain types of NEs and the resulting metrics at the NEs after performing the resets). This metric data may be used to train the predictive model to determine predicted metrics measuring a network impact that may occur as a result of performing the reset at the NE. As mentioned above, the predicted metrics may be used to determine a network impact level of performing the reset at the NE.

The network impact level of performing the reset at the NE may also be based on the architecture of the NEs. The network impact level of performing the reset may affect components at the NE other than the components that are being reset, due in part to the interconnections between the components of the NEs. For example, a reset performed at one radio component at the NE may also affect another radio component at the NE because the two components are interconnected or interrelated. The network impact application may determine an additional network impact level of performing the reset across other interconnected and interrelated components of the NE that may be affected by performing a reset at one of the components at the NE. The network impact level of performing the reset at the NE may then include this additional network impact level of performing the reset across the other interconnected and interrelated components of the NE.

When the network impact level of the incident at the NE exceeds the network impact level of performing the reset at the NE, the network impact application may instruct the reset application to perform the reset at the NE. In contrast, when the network impact level of the incident at the NE is less than the network impact level of performing the reset at the NE, the network impact application may instruct the reset application to determine another reset to perform at the NE in an attempt to resolve the incident. As mentioned above, the other reset may be determined using the series of resets or using the predictive model.

In some cases, the network impact application may determine that a first reset performed at an optimal reset time still has a network impact level higher than that of a second reset performed at an optimal reset time, and both resets may have a similar confidence score (e.g., likelihood of resolving the incident). In such a case, the reset application may determine that the second reset may be performed instead of the first reset, given the comparison of the network impact levels of the two resets.

Therefore, the embodiments disclosed herein are generally directed to determining an optimal time to performing a determined reset, and then comparing a network impact of an incident occurring at an NE with the network impact of attempting to resolve the incident using the determined reset, until an optimal reset is determined. As such, the embodiments disclosed herein efficiently and automatically implements resets at the RAN while reducing the network impact that may occur as a result of performing the reset, thereby conserving network capacity.

Turning now to FIG. 1, a communication network 100 is described. In an embodiment, the communication network 100 comprises a radio access network (RAN) 102, a plurality of operational support systems (OSSs) 104, a network 106, a cell site maintenance tracking system 108, an alarms configuration system 110, an automated alarms handling system 112 (also sometimes referred to herein as the "automated system 112") that executes an incident management application 114, a network operation center (NOC) dashboard system 116, an incident reporting application (or system) 118, and a data store 129. In an embodiment, communication network 100 may be a telecommunications carrier networking comprising the RAN 102. The incident management system may include the RAN 102, the OSSs 104, the cell site tracking system 108, the alarms configuration system 110, the automated alarms handling system 112, the NOC dashboard system 116, the incident reporting application 118, and the data store 129.

The RAN 102 comprises a plurality of NEs, such as, for example, cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router (CSR) that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the network 100.

The cell site maintenance tracking system 108 is a system implemented by one or more computers. Computers are discussed further hereinafter. The cell site maintenance tracking system 108 is used to track maintenance activities on NEs (e.g., cell site equipment, routers, gateways, and other network equipment). When a NE is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define alarm configuration rules for when an alarm leads to automatic generation of an incident report, as described herein.

Alarms are flowed up from NEs of the RAN 102 via the OSSs 104 to be stored in the data store 129. The NOC dashboard 116 can access the alarms stored in the data store 129 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 129, with the cell site maintenance tracking system 108, the OSSs 104, the RAN 102, and other systems. NOC personnel can use the NOC dashboard 116 to manually create incident reports based on alarms reviewed in a user interface of the NOC dashboard 116. The NOC dashboard 116 may be implemented as an application executing on a computer system that is accessed by NOC personnel using one or more NOC workstations.

The incident reporting application (or system) 118 can monitor the alarms stored in the data store 129 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the network 100, as described further hereinafter. Incident reports may be referred to in some contexts or by other communication service providers as tickets or trouble tickets.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

In an embodiment, the incident management system in the communication network 100 may be enhanced to automatically determine the optimal reset to perform at the NEs in the RAN 102, determine a time at which to perform the resets in the RAN 102 based on network impact level, and ultimately perform the resets at the NEs in the RAN 102 as described herein. To this end, the incident management system may additionally include a reset application 120 and a network impact application 123. The reset application 120 and the network impact application 123 may each be implemented using one or more computer systems including memories and processors. The reset application 120 and the network impact application 123 may each be stored in a memory and executed by a processor to perform the steps described herein.

The reset application 120 may automatically implement resets in the RAN 102, maintain consistent reset records 158 regarding the resets performed at the RAN 102, and train a predictive model 143 to learn from the reset records 158 to make predictions regarding optimal types of resets to perform at the NEs in the RAN 102. The reset application 120 may determine a reset to perform at the NE based on the predetermined series of resets 161 and/or using the predictive model 143. The series of resets 161 may include multiple resets that are ordered according to a network impact level of each reset. The series of resets 161 may be stored in the data store 129 as a set of ordered identifiers identifying the resets in the specified order.

The network impact application 123 may obtain the reset determined by the reset application 120 and first determine a reset time at which to perform the reset based on a network impact rule 170. The network impact rule 170 may be logic or code that may be used to determine the time at which to perform the reset at the NE based on, for example, a current time at which the determination to perform the reset is made, the load at the NE at the current time, the load at the NE at different times of the day, week, or month, and/or any other factor. A load at the NE may be based on a number of users connected to the NE or using services provided by the NE. For example, the load at the NE from 9 am to 10 pm may be much higher than the load at the NE from 2 am to 5 am. The load at the NE may be directly related to a network impact level of a reset, in that when the load at the NE is high, a reset performed at the NE may have a high network impact level, and when the load at the NE is low, a reset performed at the NE may have a low network impact level. The network impact application 123 may also determine whether to actually perform the reset or select another reset to perform, sometimes having a different network impact level, based on a comparison between the network impact level of the incident itself and the network impact level of actually performing the reset at the NE, as further described herein.

The data store 129 may store various types of data used by the incident reporting application 118, incident management application 114, reset application 120, and network impact application 123. As shown in FIG. 1, the data store 129 may store a history of resets 140 (also sometimes referred to herein as "history of prior resets 140"), the predictive model 143, a confidence score 149, an alarm 152, an incident report 155, reset records 158, series of resets 161, NE data 164, a reset time 167, and the network impact rules 170, among other types of data. The history of resets 140 may include data describing prior resets performed at the NEs in the RAN 102, and may include data such as an identifier 173 of the NE upon which the prior reset was performed, alarm/incident data 176, a reset type 179 of the prior reset performed at the NE, etc. The alarm/incident data 176 may describe the incident and may also include data describing the alarm triggered and the incident report created for the incident. The history of resets 140 may also indicate whether the prior reset resolved or failed to resolve the incident.

The predictive model 143 may be implemented using software (e.g., algorithms, logic, and code) stored across memories, for example, in the data store 129. In an embodiment, the underlying hardware of the data store 129 and the computer system executing the reset application 120 may provide the computational resources for execution of the predictive model 143. In another embodiment, one or more servers external to the data store 129 and/or even the communication network 100 may include the hardware and software resources for execution of the predictive model 143. For example, the predictive model 143 may be a type of machine learning model that leverages algorithms and statistical techniques to analyze input features, identify patterns, and generate predictions regarding resets that may be performed at the NE based on a network impact level of the reset. The predictive model 143 may be implemented as one or more different types of models using, for example, linear regression, decision trees, support vector machines, neural networks, or ensemble methods. It should be appreciated that any type of predictive model may be used, and the underlying algorithms, computations, and machine learning libraries used by the predictive model 143 should not be limited herein. The predictive model 143 may be trained using the history of resets 140, the reset records 158, and known outcomes of whether the resets successfully resolved the incident or not. The data points and algorithms in the predictive model 143 may be used to make predictions about the optimal reset to perform at the NE in an attempt to resolve the incident.

As mentioned above, the data store 129 may store data regarding one or more alarms 152 (e.g., unresolved alarms 152) and incident reports 155 (e.g., outstanding incident reports 155 that have not yet been closed). The reset application 120 may provide incident data describing a current incident report 155, created based on an unresolved alarm 152, as input into the predictive model 143. The incident data may include an identifier 173 of the affected NE(s) in the RAN 102, details describing the alarm 152 (e.g., an identifier of the alarm 152 or a type of alarm 152), data from the incident report 155, and/or any other data describing the incident occurring at the NE that may be resolved using a reset. The predictive model 143 may perform computations and determinations based on the algorithms and data points in the predictive model 143 to output a reset (i.e., a predicted reset) with a confidence score 149 indicating a likelihood that the reset determined using the predictive model may resolve the incident. The confidence score 149 may be based on a history of similar types of resets 146 performed across one or more NEs in the RAN 102 that successfully resolved similar incidents (based on similar alarms). The network impact application 123 may determine a reset time 167, in some cases using the predictive model 143, indicating a time (e.g., a time of day, day of week, month of year, etc.) at which to perform the reset, based on the network impact rules 170.

The data store 129 may also store the NE data 164, which may describe an architecture, equipment, components, and interconnections or interrelations at the NE affected by the incident. For example, the NE data 164 may indicate whether certain radio-related components are interconnected with other radio-related components at the NE, such that if a radio reset is performed at one of the radio-related components, then other radio-related components may also be affected by the radio reset. For example, a base station may have one or more 5th Generation (5G) radio units or baseband units and one or more LTE radio units or baseband units that may be interconnected.

Figure 2A:
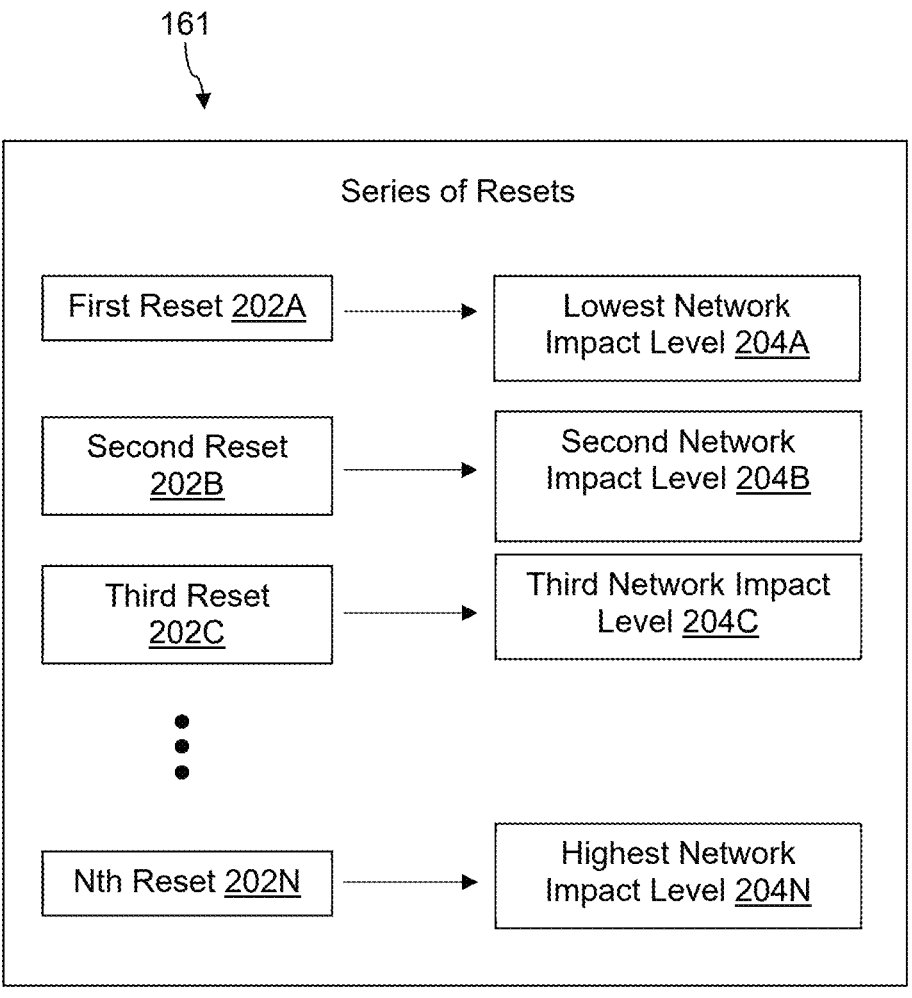
FIG. 2A is a block diagram illustrating a series of resets implemented by the communication network of FIG. 1 according to various embodiments of the disclosure.
Figure 2B:
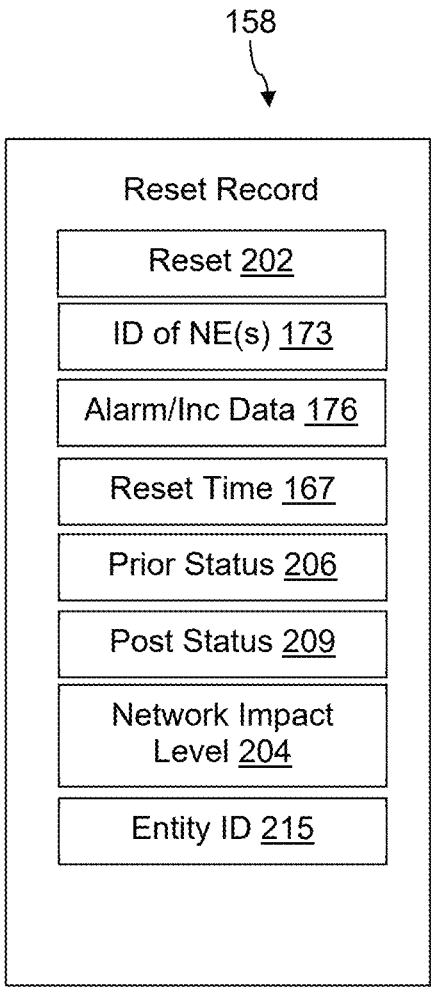
FIG. 2B illustrates an example reset record generated by the communication network of FIG. 1 according to various embodiments of the disclosure.
Figure 2C:
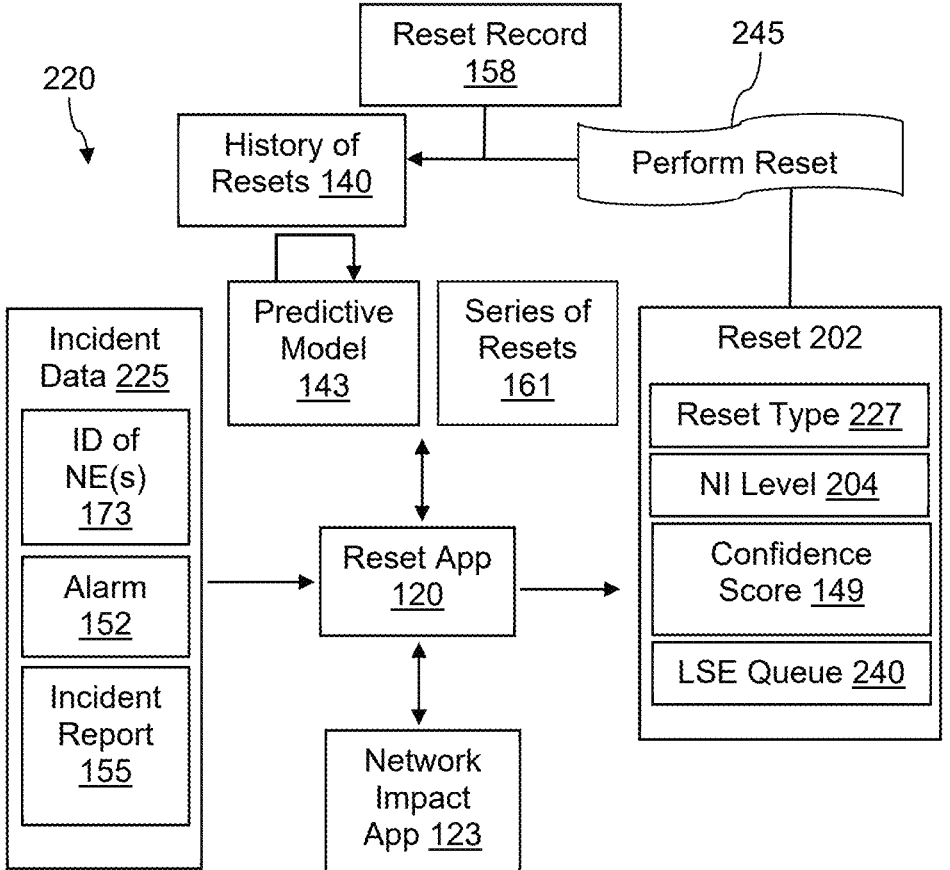
FIG. 2C is a block diagram illustrating a method of automatically implementing resets in the communication network of FIG. 1 according to various embodiments of the disclosure.
Figure 2D:
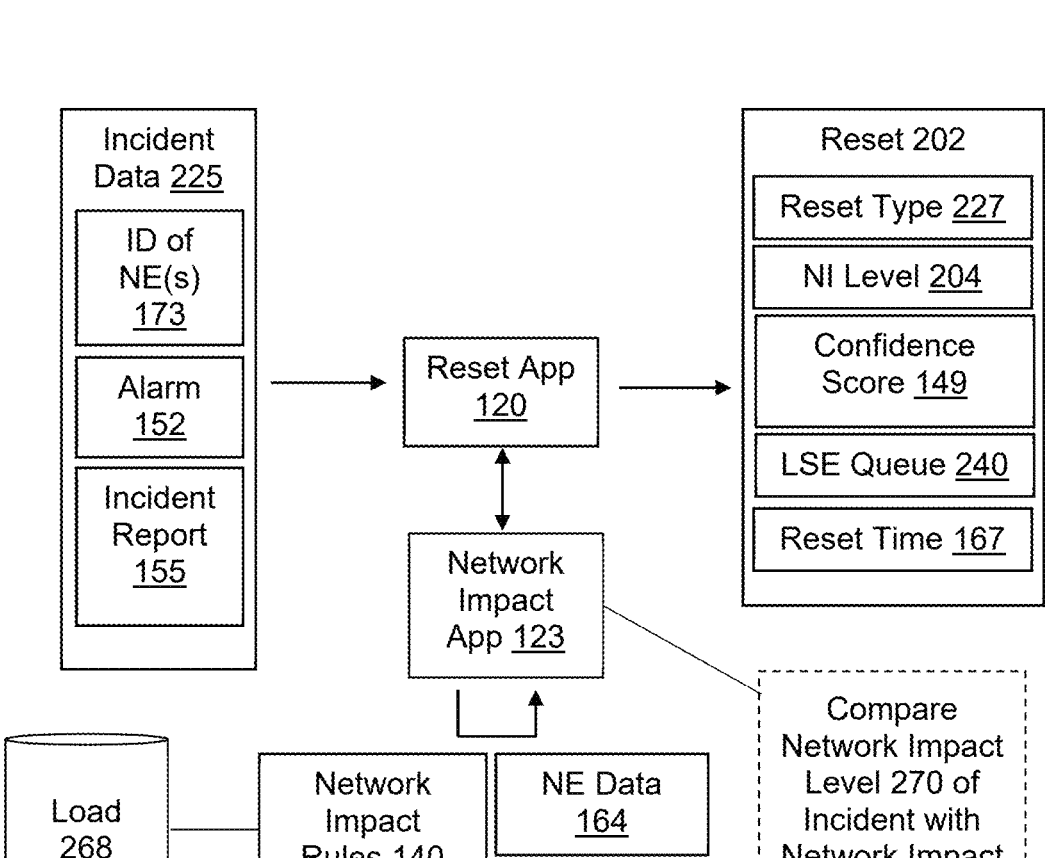
FIG. 2D is a block diagram illustrating another method of automatically implementing resets in the communication network of FIG. 1 according to various embodiments of the disclosure.

Turning now to FIGS. 2A-D, shown are block diagrams illustrating aspects of the methods and systems for automatically implementing resets in the RAN 102 according to various embodiments of the disclosure. Specifically, FIG. 2A illustrates an example of different resets in a series of resets 161, FIG. 2B illustrates an example reset record 158, and FIGS. 2C and 2D illustrate example methods performed by the reset application 120 and the network impact application 123.

Referring now specifically to FIG. 2A, shown is a diagram illustrating an example series of resets 161, including resets 202A-N, in which N may be any positive integer greater than or equal to 2. The series of resets 161 may be preset by an operator or determined by the reset application 120, as further described below. The reset application 120 may store the series of resets 161 at the data store 129 as a data structure (e.g., array, list, queue, etc.) with identifiers of each of the resets 202A-N, stored in the data structure according to the specified order.

The resets 202A-N in the series of resets 161 shown in FIG. 2A include a first reset 202A, a second reset 202B, a third reset 202C, and so on until the Nth reset 202N. Each reset may be associated with a particular network impact level 204A-N. The network impact level 204A-N may be a metric or value measuring the network impact of performing the respective reset 202A-N at an NE. The network impact level 204A-N may be manually predetermined by the operator, or may be determined by the reset application 120.

As mentioned above, in an embodiment, the reset application 120 may determine the sequence of resets 202A-N in the series of resets 161, and the sequence may be based on the network impact level 204A-N of each of the resets 202A-N. The reset application 120 may first determine a network impact level 204A-N of multiple different types of resets 202A-N that may be performed at an NE. The network impact level 204A-N may be determined in a variety of different manners, which may not be limited herein. The reset application 120 may identify key metrics related to the NE based on the type of the reset 202A-N performed at the NE. For example, the key metrics may include a quantity of users connected to the NE, a duration of the outage or degraded service provided by the NE while performing the reset 202A, and other network parameters are indicative of the performance and reliability of the NE, such as throughput, latency, packet loss, error rates, resource utilization, etc. The reset application 120 may determine the order of the resets 202A-N in the series of resets 161 based on the identified key metrics, such that the first reset 202A has the lowest network impact level 204A, the second reset 202B has the second lowest network impact level 204B, the third reset 202C has the third lowest network impact level 204C, and so on, until the Nth reset 202N, which may have the highest network impact level 204N. In this way, the order of the resets 202A-N is based on the network impact level 204A-N of the reset 202A-N, such that the first reset 202A has the lowest network impact level 204A and the Nth reset 202N has the highest network impact level 204A-N.

As an illustrative example, the first reset 202A may be a software lock and unlock, which may correspondingly have the lowest network impact level 204A. The second reset 202B may be a radio reset, which may correspondingly have the second network impact level 204B (e.g., a mid-level network impact). The Nth reset 202N may be a full hard reset of the entire NE, which may be a base station for example, and this may correspondingly have the highest network impact level 204N.

Turning now to FIG. 2B, shown is a diagram illustrating a reset record 158 according to various embodiments of the disclosure. As mentioned above, the reset application 120 may generate the reset record 158 when determining the reset 202A-N (hereinafter referred to as "reset 202") and performing the reset 202 at the NE. The reset record 158 may include an identification of the reset 202 performed at the NE. The identification of the reset 202 may be a value identifying the reset 202 or type of reset 202 performed at the NE. The reset record 158 may include an identifier 173 of the NE (or NEs) affected by the incident. The identifier 173 may be a value or address of the NE at which the reset 202 is being performed. The reset record 158 may include the alarm/incident data 176 describing the alarm 152 triggered at the NE and the corresponding incident report 155 describing the incident. The reset record 158 may also include the reset time 167, indicating a time to perform the reset 202 (as determined by the network impact application 123) and/or a time at which the reset 202 was actually performed at the NE.

The reset record 158 may also include a prior status 206 and a post status 209 indicating statuses of the NE before and after the reset 202 was performed at the NE. The prior status 206 may indicate a status of the NE before the reset 202 was performed at the NE. The prior status 206 may indicate, for example, the state of the NE when the NE is experiencing the incident. To this end, the prior status 206 may include data collected from the NE before the reset 202 is performed at the NE, describing, for example, a number of users connected to the NE, whether an outage is being experienced at the NE, whether degraded services are being provided by the NE, data describing a performance, reliability, and/or security metric at the NE, etc. The post status 209 may indicate a status of the NE after the reset 202 is performed at the NE. For example, the post status 209 may indicate the state of the NE either when the incident has been resolved or when the NE still continues to experience the incident (i.e., because the reset 202 failed to truly resolve the incident). To this end, the post status 209 may include data collected from the NE after the reset 202 is performed at the NE, describing, for example, a number of users connected to the NE, whether an outage is being experienced at the NE, whether degraded services are being provided by the NE, data describing a performance, reliability, and/or security metric at the NE, etc.

The reset record 158 may also include the network impact level 204A-D (hereinafter referred to as "network impact level 204") associated with the reset 202. For example, a value or metric associated with the network impact level 204 may be stored in the reset record 158 associated with the reset 202. The reset record 158 may also store an entity identifier 215, which may include an identifier identifying an entity that performed that reset 202 at the NE. For example, the entity may be the automated system 112, a maintenance technician, a NOC operator (or corresponding NOC station), etc. The entity identifier 215 may be an employee identifier or phone number, for example, when the entity is a maintenance technician or NOC operator. It should be appreciated that the reset record 158 may include other types of data not necessarily shown in FIG. 2B or even described herein.

Turning now to FIG. 2C, shown is a block diagram illustrating a method 220 of automatically performing resets in the RAN 102 according to various embodiments of the disclosure. Specifically, the method 220 illustrates the reset application 120 using the predictive model 143 and/or the series of resets 161 to determine a reset 202.

The reset application 120 may first obtain the incident data 225, which may include data describing the alarm 152 and/or the incident report 155 and an identifier 173 of the NE on which the instruction to perform the reset 202 has been received. The alarm 152 may have been triggered at the NE, and the incident report 155 may have been created in response to the alarm 152.

The reset application 120 may then determine a reset 202 based on the series of resets 161 and/or the predictive model 143. In an embodiment, the reset application 120 may use the series of resets 161 to determine the reset 202 to perform at the NE when the predictive model 143 has not been sufficiently trained to predict an optimal reset 202 based on the incident data 225 (e.g., when the predicted model 143 has not been trained with sufficient data related to similar alarms 152 and incident reports 155). The reset application 120 may obtain the series of resets 161, which may be specific for the NE or the type of NE on which the reset 202 is to be performed, and obtain an identifier of the first reset 202 in the series of resets 161. The reset application 120 may then instruct the reset 202 to be performed at the NE by an entity (e.g., the automated system 112, NOC operator, and/or technician).

In an embodiment, the reset application 120 may use the predictive model 143 to determine the reset 202 to perform at the NE when the predictive model 143 has been sufficiently trained to predict an optimal reset 202 based on the incident data 225 (e.g., when the predicted model 143 has been trained with a sufficient amount of data related to similar alarms 152 and incident reports 155). The reset application 120 may provide the incident data 225 as input into the predictive model 143. The predictive model 143 may perform various computations using the algorithms and data points of the predictive model 143 to determine a reset 202 to perform at the NE. The reset 202 may be determined to be the optimal reset 202 to perform at the NE based on the network impact level 204 of reset 202 and the confidence score 149 of the reset 202

The reset 202 may be associated with a reset type 227, network impact level 204, and confidence score 149. The reset type 227 may be a type or category of the reset 202, which may in some cases also be related to the network impact level 204 of the reset 202. As mentioned above, the reset application 120 may determine the network impact level 204 based on key metrics associated with the reset 202 or reset type 227 to be performed at the NE. The reset application 120 may also use the predictive model 143 to determine the confidence score 149. The predictive model 143 may store data describing the types of incidents at NEs that may be successfully resolved with a certain type of reset 202, and the types of incidents at NEs that may not be successfully resolved with a certain type of reset 202. This data may be used by the predictive model 143 to determine the confidence score 149 indicating a likelihood that performing a similar reset 202 at similar types of NEs for similar types of incidents may be successful or not. For example, the predictive model 143 may indicate that a radio reset performed at base stations experiencing a certain type of incident resolves this type of incident 85 percent (%) of the time. In this case, the confidence score 149 may be a value indicating that the reset 202 predicted by the predictive model 143 has successfully resolved a similar incident at a similar NE 85% of the time.

When the reset 202 is determined to be performed on the NE as part of a resolution attempt for an LSE, the reset 202 may also be associated with an LSE queue 240. As mentioned above, the reset application 120 may place the reset

202 of the NE into a particular LSE queue 240, such that the instruction to perform the reset 202 may be performed at a particular time window, to avoid resetting all of the affected NEs of the LSE at once. The reset application 120 may strategically queue up the resets 202 across different NEs in multiple LSE queues 240 in a cascading manner. For example, the reset application 120 may add the reset 202 at the NE into a particular LSE queue 240 such that the reset 202 is performed on the NE at a time different from when resets 202 are performed on other NEs that are part of the LSE. In this way, each LSE queue 240 may be associated with a particular time at which to perform the determined reset 202. For example, the reset 202 may be performed on the NE based on the LSE queue 240, and other NEs that are affected by the LSE but within the same coverage area of users that may have otherwise connected to the NE may not be reset 202 at the same time. This may prevent multiple users from being disconnected at the same time when performing resets 202 across all of the NEs.

As will be further discussed below with reference to FIG. 2D, the reset application 120 may communicate details regarding the reset 202 and incident data 225 to the network impact application 123, and the network impact application 123 may determine whether to perform the reset 202 or identify another reset 202 to perform at the NE. The network impact application 123 may then determine a reset time 167 at which to perform the reset 202.

Once the network impact application 123 confirms that the reset 202 may indeed be performed at the NE, the reset application 120 may instruct the entity to perform the reset 202 at the NE, as shown in box 245. During the time that the reset application 120 is determining the reset 202 and during the time that the reset 202 is being performed at the NE, the reset application 120 may generate the reset record 158. The reset record 158 may describe the reset 202, the incident data 225, the network impact level 204, the confidence score 149, etc. The reset application 120 may also determine the prior status 206 and the post status 209, which may be included in the reset record 158. The reset application 120 may store the reset record 158 into a database (or table) at the data store 129.

The reset application 120 may also store the details from the reset record 158 into the history of resets 140, which may then be used as additional data points to further train the predictive model 143. For example, the post status 209 of performing the reset 202 at the NE, which may indicate whether the reset 202 resolved the incident, may be used as additional data points that may further train the predictive model 143 on how to make more accurate predictions on the optimal types of resets 202 that may be performed at similar NEs for similar types of incidents.

Turning now to FIG. 2D, shown is a block diagram illustrating a method 265 of determining when and whether to actually perform the reset 202 at the NE according to various embodiments of the disclosure. Specifically, the method 265 illustrates the network impact application 123 using the network impact rules 170 and the NE data 164 to determine when and whether to actually perform the reset 202 at the NE.

As mentioned above, the reset application 120 determines the reset 202 to be performed at the NE. The network impact application 123 may obtain the determined reset 202 and the incident data 225 to determine a reset time 167 at which to actually perform the reset 202 using one or more network impact rules 170. A network impact rule 170 may indicate an optimal time to perform the reset 202 based on various factors, such as, for example, a load 268 at the NE at various times of the day, days of week, months of the year, etc. The network impact rule 170 may also be based on the NE data 164 indicating the different types of equipment at the NEs, the interconnections and interrelations between radio components at the NEs, etc. The network impact rule 170 may be logic, code, or instructions that may be specific to types of NEs, types of resets 202, and/or types of incidents. The load 268 may be stored in the data store 129, or another data store accessible by the network impact application 123.

The network impact application 123 may provide data describing the reset 202 and/or the incident data 225 as input into the network impact rule 170, and the network impact rule 170 may have access to the load 268 at the NE at various times and the NE data 164, such that the network impact rule 170 may output the reset time 167 to perform the reset 202 at the NE. For example, the network impact rule 170 for performing the reset 202 at the NE may indicate that the reset 202 of the reset type 227 having a certain network impact level 204 may be performed at any time of day when the load 268 at the NE is generally constant throughout the day. Alternatively, the network impact rule 170 for performing the reset 202 at the NE may be best performed during a maintenance window between 2 am and 5 am, which may be a time with the lowest load 268 across one or more interrelated components at the NE (e.g., when the least number of users are connected to the one or more interrelated components at the NE and using the resources at the one or more interrelated components at the NE).

The network impact application 123 may also determine whether to perform the determined reset 202 or determine another reset 202 to perform at the NE (e.g., based on the series of resets 161 and/or using the predictive model 143). This determination may be based on comparing a network impact level 270 of the incident at the NE with the network impact level 204 of performing the reset 202 at the NE. The network impact level 270 of the incident at the NE may be a value measuring a network impact of the incident at the NE, which may include certain metrics associated with network attributes (e.g., the performance, reliability, and/or security) at the NE when the incident is occurring at the NE. As described above, the network impact level 204 of performing the reset 202 at the NE may be a value based on predicted metrics associated with the network attributes at the NE after performing the reset 202 at the NE.

To determine the network impact level 270 of the incident at the NE, the network impact application 123 may compare baseline metrics associated with the network attributes at the NE before the incident occurs at the NE with the same metrics associated with the network attributes at the NE while or after the incident occurs at the NE, to determine deviations from the baseline metrics. The deviations from the baseline metrics may indicate the network impact level 270 of the incident at the NE. For example, the network impact application 123 may determine a first difference between a performance metric at the NE before the incident and the performance metric at the NE after the incident, in which the performance metric may be associated with at least one of a throughput at the NE, a latency at the NE, a packet loss at the NE, etc. The network impact application 123 may determine a second difference between a reliability metric at the NE before the incident and the reliability metric at the NE after the incident, in which the reliability metric may be associated with at least one of an operational time period, mean time between failures, mean time between recovery, etc. The network impact application 123 may determine a third difference between a user experience metric at the NE before the incident and the user experience metric at the NE after the incident, in which the user experience metric may be associated with a quantity of impacted users (e.g., quantity of users connected to the NE or using services provided by the NE). The network impact application 123 may determine a fourth difference between operational metrics at the NE before the incident and the operational metrics at the NE after the incident, in which the operational metrics are associated with at least one of resource utilization percentages, error rates in communications or operations, frequency of security incidents, effectiveness of security controls at the NE, etc. The network impact level 270 of the incident at the NE may be based on at least one of the first difference, second difference, third difference, and/or fourth difference. In some cases, the network impact level 270 of the incident at the NE may be a value corresponding to a sum of at least one of the first difference, second difference, third difference, and/or fourth difference.

To determine the network impact level 204 of performing the reset 202 at the NE, the network impact application 123 may compare current metrics associated with the network attributes at the NE before the reset 202 is performed at the NE with predicted (e.g., expected) metrics that may occur as a result of performing the reset 202 at the NE, to determine deviations from the current metrics. The current metrics may be in some cases the same as the metrics associated with the network attributes at the NE while or after the incident occurs at the NE. The deviations from the current metrics may indicate the network impact level 204 of performing the reset 202 at the NE. For example, the network impact application 123 may determine a first difference between a performance metric at the NE before the reset 202 is performed and a predicted performance metric at the NE after the reset 202 is performed, in which the performance metric and the predicted performance metric are associated with at least one of a throughput at the NE, a latency at the NE, a packet loss at the NE, etc. The network impact application 123 may determine a second difference between a reliability metric at the NE before the reset 202 is performed and a predicted reliability metric at the NE after the reset 202 is performed, in which the reliability metric and the predicted reliability metric are associated with at least one of an operational time period, mean time between failures, mean time between recovery etc. The network impact application 123 may determine a third difference between a user experience metric at the NE before the reset 202 is performed and a predicted user experience metric at the NE after the reset 202 is performed, in which the user experience metric and the predicted user experience metric associated with a quantity of impacted users. The network impact application 123 may determine a fourth difference between operational metrics at the NE before the reset 202 is performed and a predicted operational metrics at the NE after the reset is performed. The operational metrics and the predicted operational metrics are associated with at least one of resource utilization percentages, error rates in communications or operations, frequency of security incidents, effectiveness of security controls, status of one or more cells/ radios, etc. The network impact level 204 of performing the reset 202 at the NE may be based on at least one of the first difference, second difference, third difference, and/or fourth difference. In some cases, the network impact level 204 of performing the reset 202 at the NE may be a value corresponding to a sum of at least one of the first difference, second difference, third difference, and/or fourth difference.

Values related to each of the aforementioned metrics may be obtained (e.g., received, determined, calculated, etc.)

from the data store 129 storing historical metric data of the NE, which may be included in the history of resets 140. For example, the network impact application 123 may receive the metrics (e.g., performance metrics, reliability metrics, security metrics, user experience metrics, operational metrics, etc.) of the NE from the history of resets 140. The network impact application 123 may also receive data related to the metrics of the NE (e.g., recorded throughput/bandwidth/latencies at the NEs, counts related to the use and load at the NE, security measures performed at the NE, etc.) from the data store 129, which may be used to calculate or otherwise determine the metrics of the NE that may affect the network impact levels 204, 270 described above. In some cases, the network impact application 123 may receive or obtain the baseline metrics, current metrics, and other metrics while or after the incident occurs based on data from the data store 129.

In others cases, the network impact application 123 may obtain the values related to metrics using the predictive model 143. For example, the predicted metrics at the NE when the reset 202 is performed at the NE may be obtained using the predicted model 143. Metric data describing metrics associated with NEs before and after resets 202 are performed at the NEs may be input into the predictive model 143 as training data (e.g., data points used to train the algorithms of the predictive model 143 to accurately identify trends between resets 202 performed at certain types of NEs and the resulting metrics at the NEs after performing the resets 202). This metric data may be used to train the predictive model 143 to determine the predicted metrics that may occur as a result of performing the reset 202 at the NE, which as mentioned above, may be used to determine a network impact level 204 of performing the reset at the NE. For example, the network impact application 123 may input the type of NE at which the reset 202 is to be performed and the type of reset 202 determined to be performed at the NE into the predictive model 143. In response, the predictive model 143 may output a predicted network impact level 204 of performing the reset 202 at the NE.

The network impact level 204 of performing the reset 202 at the NE may further be based on the NE data 164, which again may indicate an architecture and interconnections between the components at the NE. The network impact level 204 of performing the reset 202 may affect more components at the NE than the components that are being reset at the NE based on, for example, the interconnections between the components of the NEs. The network impact application 123 may determine an additional network impact level 204 of performing the reset 202 based on all of the interrelated or interconnected components. The additional network impact level 204 of performing the reset 202 may be based on the reset 202 and based on the foregoing calculations of the different types of metrics that may affect the network impact level 204 of performing the reset 202 at the affected interrelated or interconnected components at the NE. The network impact level 204 of performing the reset 202 at the NE may include this additional network impact level 204 of performing the reset across all interconnected and interrelated components of the NE.

When the network impact level 270 of the incident at the NE exceeds the network impact level 204 of performing the reset 202 at the NE, the network impact application 123 may instruct the reset application 120 to perform the reset 202 at the NE. The reset application 120 may instruct the entity (e.g., NOC operator, maintenance technician, or automated handling system 112) to perform the reset 202 at the NE, using for example, a command line instruction.

When the network impact level 270 of the incident at the NE is less than the network impact level 204 of performing the reset 202 at the NE, the network impact application 123 may instruct the reset application 120 to determine another reset to perform at the NE in an attempt to resolve the incident. The reset application 120 may again use the series of resets 161 (e.g., the next reset 202 in the ordered sequence of resets 202 of the series of resets 161) or use the predictive model 143 to determine the other reset 202, and then proceed through the methods 220 and 265 accordingly for the other reset 202.

Turning now to FIG. 3, a method 300 is described. Method 300 may be performed by the reset application 120 and network impact application 123 of the communication network 100. In an embodiment, the reset application 120 may be executed at the automated alarms handling system 112 or another computer system (e.g., computer system 380 of FIG. 6 further described below). Similarly, the network impact application 123 may be executed at the automated alarms handling system 112 or another computer system (e.g., computer system 380 of FIG. 6 further described below). Method 300 may be performed before the reset application 120 determines a first reset 202 to perform at the NE.

At step 303, method 300 may comprise determining, by a reset application 120 of the communication network 100, a first reset 202 to perform at a NE in the RAN 102. At step 305, method 300 may comprise determining, by a network impact application 123 of the communication network 100, a reset time 167 at which to perform the first reset 202 at the NE based on a network impact rule 170, wherein the network impact rule 170 indicates an optimal time to perform the first reset 202 at the NE based on a load 268 at the NE at various times. At step 309, method 300 may comprise comparing, by the network impact application 123, a network impact level 270 of the incident at the NE with a network impact level 204 of performing the first reset 202 at the NE. The network impact level 270 of the incident at the NE may comprise a value measuring a network impact of the incident at the NE, and the network impact level 204 of performing the first reset 202 at the NE corresponds to a value measuring a network impact of performing the first reset 202 at the NE. At step 311, method 300 may comprise, when the network impact level 270 of the incident at the NE is less than the network impact level 204 of performing the first reset 202 at the NE, determining, by the reset application 120, a second reset 202 to perform at the NE in an attempt to resolve the incident. At step 317, method 300 may comprise, when the network impact level 270 of the incident at the NE exceeds the network impact level 204 of performing the first reset 202 at the NE, instructing, by the reset application 120, the first reset 202 to be performed at the NE.

Method 300 may comprise other attributes and steps not otherwise shown in the flowchart of FIG. 3 or 4. In an embodiment, the first reset 202 is determined to be performed at the NE in response to an incident report 155 describing the incident occurring at the NE. In an embodiment, the first reset 202 is determined based on at least one of a predictive model 143 or a series of resets 161 comprising a plurality of resets 202 ordered according to a network impact level 204 of each reset. In an embodiment, the first reset 202 is associated with a first confidence score 149 indicating a first likelihood that the first reset will resolve an incident at the NE, the second reset 202 is associated with a second confidence score 149 indicating a second likelihood that the second reset will resolve the incident at the NE, and the first confidence score is greater than the second confidence score.

In an embodiment, method 300 may further comprise determining the network impact level 270 of the incident at the NE by performing at least one of determining, by the network impact application 123, a first difference between a performance metric at the NE before the incident and the performance metric at the NE after the incident, wherein the performance metric is associated with at least one of a throughput at the NE, a latency at the NE, or a packet loss at the NE, determining, by the network impact application 12, a second difference between a reliability metric at the NE before the incident and the reliability metric at the NE after the incident, wherein the reliability metric is associated with at least one of an operational time period, mean time between failures, or mean time between recovery, determining, by the network impact application 123, a third difference between a user experience metric at the NE before the incident and the user experience metric at the NE after the incident, wherein the user experience metric is associated with a quantity of impacted users, determining, by the network impact application 123, a fourth difference between operational metrics at the NE before the incident and the operational metrics at the NE after the incident, wherein the operational metrics are associated with at least one of resource utilization percentages, error rates in communications or operations, frequency of security incidents, or effectiveness of security controls. The value of the network impact level 270 of the incident at the NE may be based on at least one of the first difference, second difference, third difference, and fourth difference.

In an embodiment, method 300 may further comprise determining the network impact level 204 of performing the first reset 202 at the NE by performing at least one of determining, by the network impact application 123, a first difference between a performance metric at the NE before the first reset 202 and a predicted performance metric at the NE after the first reset 202, wherein the performance metric and the predicted performance metric are associated with at least one of a throughput at the NE, a latency at the NE, or a packet loss at the NE, determining, by the network impact application 123, a second difference between a reliability metric at the NE before the first reset 202 and a predicted reliability metric at the NE after the first reset 202, wherein the reliability metric and the predicted reliability metric are associated with at least one of an operational time period, mean time between failures, or mean time between recovery, determining, by the network impact application 123, a third difference between a user experience metric at the NE before the first reset 202 and a predicted user experience metric at the NE after the first reset 202, wherein the user experience metric and the predicted user experience metric associated with a quantity of impacted, determining, by the network impact application 123, a fourth difference between operational metrics at the NE before the first reset 202 and a predicted operational metrics at the NE after the first reset 202, wherein the operational metrics and the predicted operational metrics are associated with at least one of resource utilization percentages, error rates in communications or operations, frequency of security incidents, or effectiveness of security controls. The value of the network impact level 204 of performing the first reset 202 at the NE may be based on at least one of the first difference, second difference, third difference, and fourth difference.

In an embodiment, method 300 may further comprise training, by a network impact application 123, a predictive model 143 based on the comparing between the network impact level 270 of the incident at the NE with the network impact level 204 of performing the first reset 202 at the NE. In an embodiment, method 300 may further comprise training, by the network impact application 123, a predictive model 143 based on historical data (e.g., history of resets 140) describing a plurality of different comparisons between the network impact level 270 of the incident at a plurality of different NE with the network impact level 204 of performing the first reset 202 at the different NEs. In an embodiment, method 300 may further comprise training, by the network impact application 123, a predictive model 143 based on the reset time 167 at which to perform the first reset 202 at the NE.

Turning now to FIG. 4, a method 400 is described. Method 400 may be performed by the reset application 120 and network impact application 123 of the communication network 100. In an embodiment, the reset application 120 may be executed at the automated alarms handling system 112 or another computer system (e.g., computer system 380 of FIG. 6 further described below). Similarly, the network impact application 123 may be executed at the automated alarms handling system 112 or another computer system (e.g., computer system 380 of FIG. 6 further described below). Method 400 may be performed after when the reset application 120 determines a reset 202 to be performed at an NE.

At step 403, method 400 may comprise determining, by a reset application 120 of the communication network 100, a reset 202 to perform at a NE in the RAN 102. The reset 202 is associated with a first confidence score 149 indicating a first likelihood that the reset 202 will resolve an incident at the NE. At step 405, method 400 may comprise determining, by a network impact application 123 of the communication network 100, a reset time 167 at which to perform the reset 202 at the NE based on a network impact rule 170, in which the network impact rule 170 indicates an optimal time to perform the reset 202 at the NE based on a load 268 at the NE at various times.

At step 409, method 400 may comprise comparing, by the network impact application 123, a network impact level 270 of the incident at the NE with a network impact level 204 of performing the reset 202 at the NE. The network impact level 270 of the incident at the NE comprises a value measuring a network impact of the incident at the NE, and the network impact level 270 of performing the reset 202 at the NE corresponds to a value measuring a network impact of performing the reset 202 at the NE.

At step 411, method 400 may comprise, when the network impact level 270 of the incident at the NE is less than the network impact level 204 of performing the reset 202 at the NE, determining, by the reset application 120, a second reset 202 to perform at the NE in an attempt to resolve the incident. The second reset 202 is associated with a second confidence score 149 indicating a second likelihood that the second reset 202 will resolve the incident at the NE.

Method 400 may comprise other attributes and steps not otherwise shown in the flowchart of FIG. 4. In an embodiment, method 400 may further comprise, when the network impact level 270 of the incident at the NE exceeds the network impact level 204 of performing the first reset 202 at the NE, instructing, by the reset application 120, the first reset 202 to be performed at the NE. In an embodiment, the first confidence score 149 is greater than the second confidence score 149. In an embodiment, method 400 may further comprise determining, by the reset application 120, the first confidence score 149 based on historical data indicating that prior resets 202 (e.g., history of resets 140) similar to the reset 202 have successfully resolved similar incidents at other NEs, and determining, by the reset application 120, the second confidence score 149 based on the historical data further indicating that prior resets 202 similar to the reset 202 have successfully resolved similar incidents at the other NE. In an embodiment, the network impact rule 170 comprises logic defining one or more conditions that guide the determining of the reset time 167 to perform the reset 202 at the NE, wherein in which one or more conditions are based on a history of the load 268 at the NE at various time in the past.

Figure 5A:
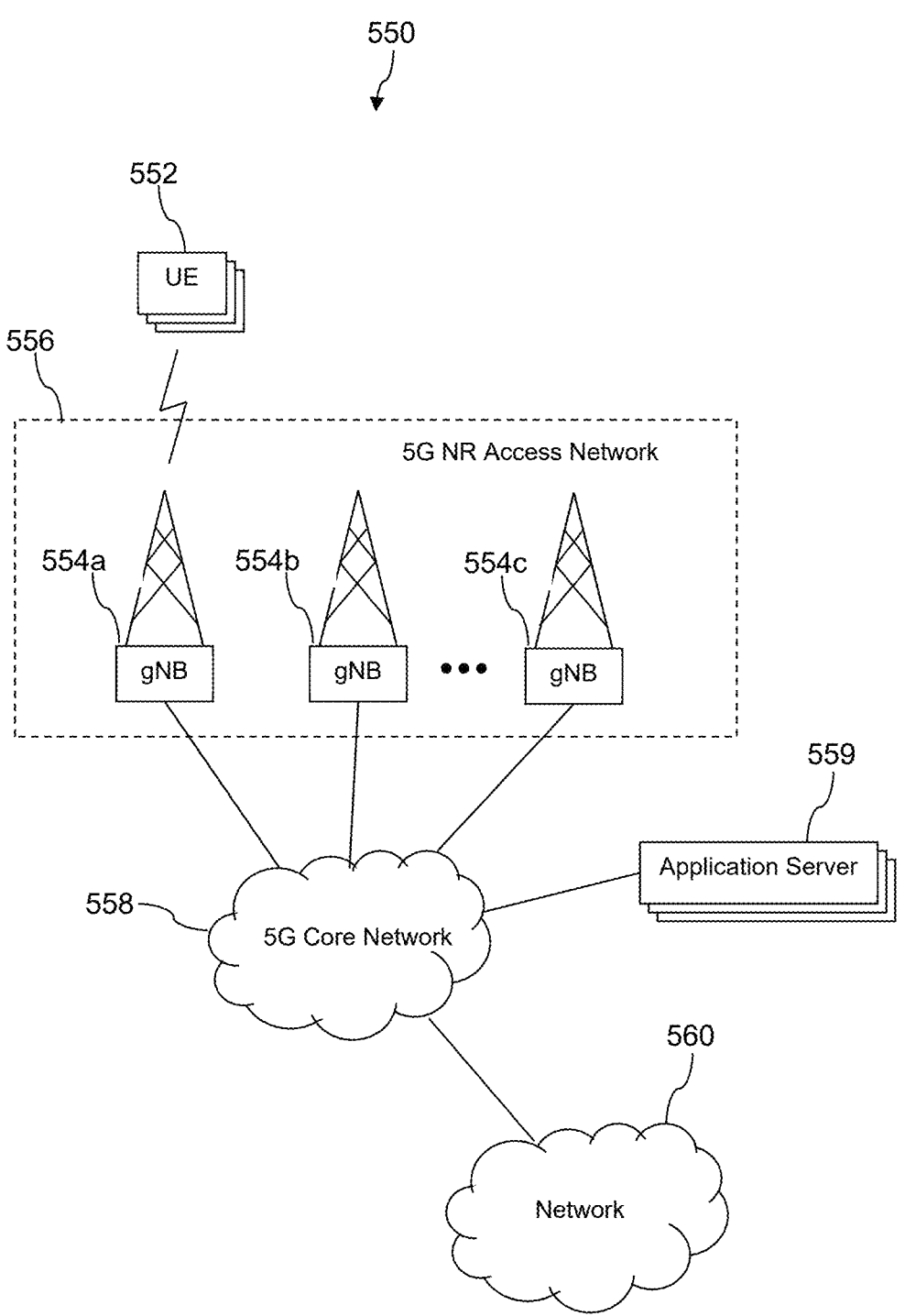
FIG. 5A and FIG. 5B are block diagrams of a 5G network according to an embodiment of the disclosure.

Turning now to FIG. 5A, an exemplary communication system 550 is described, similar to the communication network 100. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
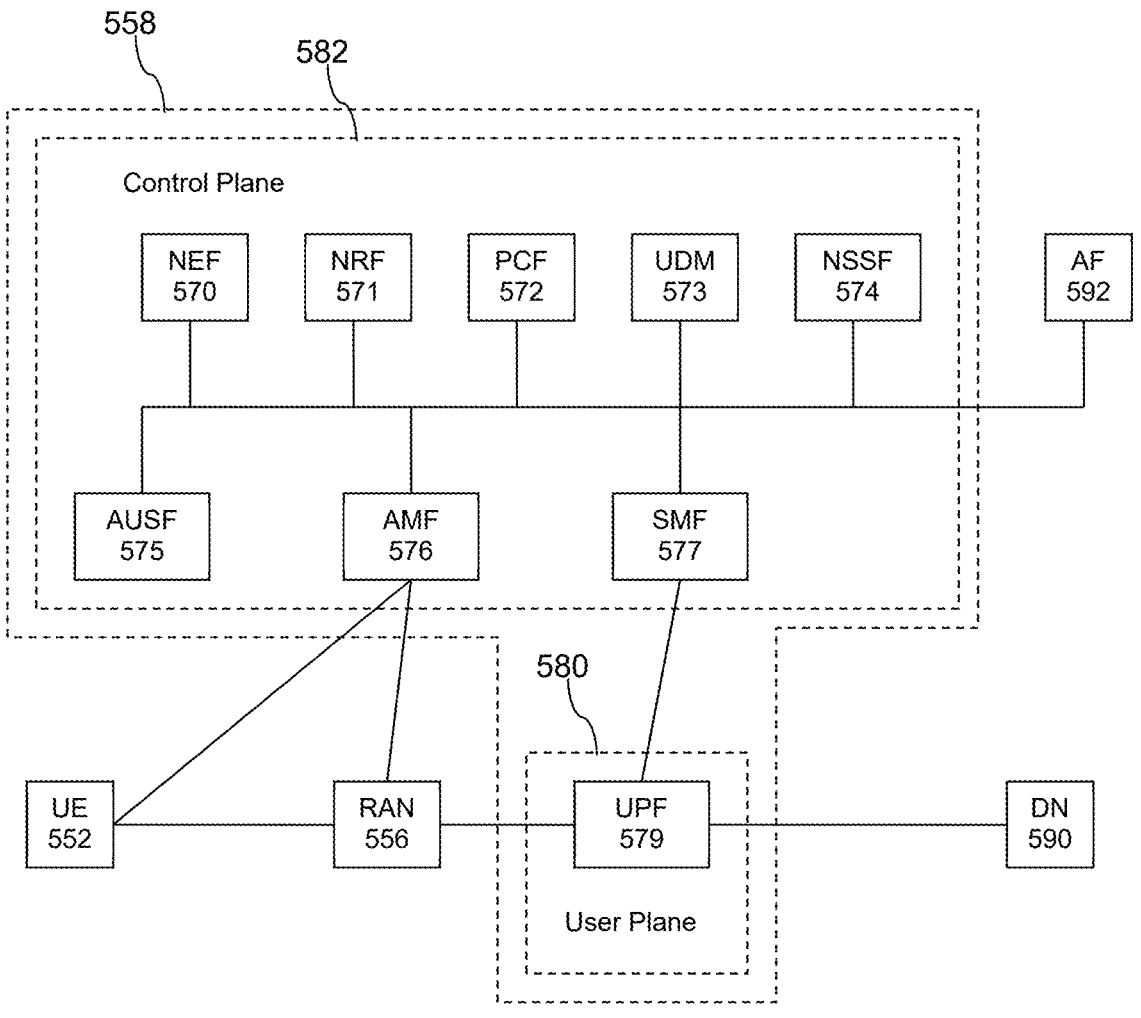

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
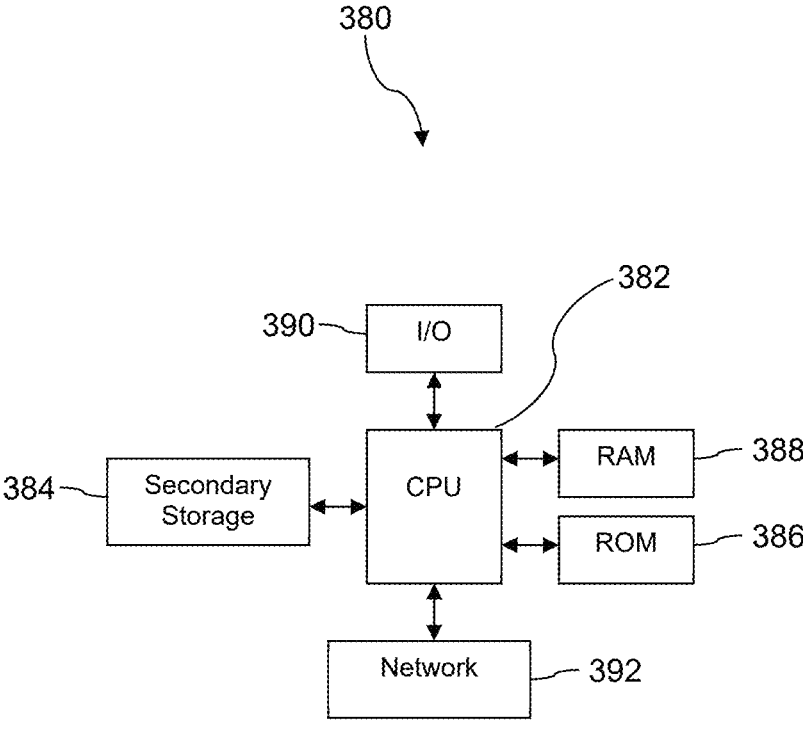
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for automatically implementing resets in a radio access network of a communication network, wherein the method comprises:
determining, by a reset application of the communication network, a reset to perform at a network element in the radio access network, wherein the reset is associated with a first confidence score indicating a first likelihood that the reset will resolve an incident at the network element;
determining, by a network impact application of the communication network, a reset time at which to perform the reset at the network element based on a network impact rule, wherein the network impact rule indicates an optimal time to perform the reset at the network element based on a load at the network element at various times;
comparing, by the network impact application, a network impact level of the incident at the network element with a network impact level of performing the reset at the network element, wherein the network impact level of the incident at the network element comprises a value measuring a network impact of the incident at the network element, and wherein the network impact level of performing the reset at the network element corresponds to a value measuring a network impact of performing the reset at the network element; and
when the network impact level of the incident at the network element is less than the network impact level of performing the reset at the network element, determining, by the reset application, a second reset to perform at the network element in an attempt to resolve the incident, wherein the second reset is associated with a second confidence score indicating a second likelihood that the second reset will resolve the incident at the network element.

2. The method of claim 1, further comprising, when the network impact level of the incident at the network element exceeds the network impact level of performing the reset at the network element, instructing, by the reset application, the reset to be performed at the network element.

3. The method of claim 1, wherein the first confidence score is greater than the second confidence score.

4. The method of claim 1, further comprising:
determining, by the reset application, the first confidence score based on historical data indicating that prior resets similar to the reset have successfully resolved similar incidents at other network elements; and
determining, by the reset application, the second confidence score based on the historical data further indicating that prior resets similar to the second reset have successfully resolved similar incidents at the other network elements.

5. The method of claim 1, wherein the network impact rule comprises logic defining one or more conditions that guide the determining of the reset time to perform the reset at the network element, wherein the one or more conditions are based on a history of the load at the network element at various prior times.

6. A method for automatically implementing resets in a radio access network of a communication network, wherein the method comprises:

determining, by a reset application of the communication network, a first reset to perform at a network element in the radio access network;

determining, by a network impact application of the communication network, a reset time at which to perform the first reset at the network element based on a network impact rule, wherein the network impact rule indicates an optimal time to perform the first reset at the network element based on a load at the network element at various times;

comparing, by the network impact application, a network impact level of an incident at the network element with a network impact level of performing the first reset at the network element, wherein the network impact level of the incident at the network element comprises a value measuring a network impact of the incident at the network element, and wherein the network impact level of performing the first reset at the network element corresponds to a value measuring a network impact of performing the first reset at the network element;

when the network impact level of the incident at the network element is less than the network impact level of performing the first reset at the network element, determining, by the reset application, a second reset to perform at the network element in an attempt to resolve the incident; and when the network impact level of the incident at the network element exceeds the network impact level of performing the first reset at the network element, instructing, by the reset application, the first reset to be performed at the network element.

7. The method of claim 6, wherein the first reset is determined to be performed at the network element in response to the incident report describing the incident occurring at the network element.

8. The method of claim 6, wherein the first reset is determined based on at least one of a predictive model or a series of resets comprising a plurality of resets ordered according to a network impact level of each reset.

9. The method of claim 6, wherein the first reset is associated with a first confidence score indicating a first likelihood that the first reset will resolve the incident at the network element, wherein the second reset is associated with a second confidence score indicating a second likelihood that the second reset will resolve the incident at the network element, and wherein the first confidence score is greater than the second confidence score.

10. The method of claim 6, further comprising determining the network impact level of the incident at the network element by performing at least one of:

determining, by the network impact application, a first difference between a performance metric at the network element before the incident and the performance metric at the network element after the incident, wherein the performance metric is associated with at least one of a throughput at the network element, a latency at the network element, or a packet loss at the network element;

determining, by the network impact application, a second difference between a reliability metric at the network element before the incident and the reliability metric at the network element after the incident, wherein the reliability metric is associated with at least one of an operational time period, mean time between failures, or mean time between recovery;

determining, by the network impact application, a third difference between a user experience metric at the network element before the incident and the user experience metric at the network element after the incident, wherein the user experience metric is associated with a quantity of impacted users; and determining, by the network impact application, a fourth difference between operational metrics at the network element before the incident and the operational metrics at the network element after the incident, wherein the operational metrics are associated with at least one of resource utilization percentages, error rates in communications or operations, frequency of security incidents, or effectiveness of security controls, wherein the value of the network impact level of the incident at the network element is based on at least one of the first difference, second difference, third difference, and fourth difference.

11. The method of claim 6, further comprising determining the network impact level of performing the first reset at the network element by performing at least one of:

determining, by the network impact application, a first difference between a performance metric at the network element before the first reset and a predicted performance metric at the network element after the first reset, wherein the performance metric and the predicted performance metric are associated with at least one of a throughput at the network element, a latency at the network element, or a packet loss at the network element;

determining, by the network impact application, a second difference between a reliability metric at the network element before the first reset and a predicted reliability metric at the network element after the first reset, wherein the reliability metric and the predicted reliability metric are associated with at least one of an operational time period, mean time between failures, or mean time between recovery;

determining, by the network impact application, a third difference between a user experience metric at the network element before the first reset and a predicted user experience metric at the network element after the first reset, wherein the user experience metric and the predicted user experience metric associated with a quantity of impacted users; and determining, by the network impact application, a fourth difference between operational metrics at the network element before the first reset and a predicted operational metrics at the network element after the first reset, wherein the operational metrics and the predicted operational metrics are associated with at least one of resource utilization percentages, error rates in communications or operations, frequency of security incidents, or effectiveness of security controls, wherein the value of the network impact level of performing the first reset at the network element is based on at least one of the first difference, second difference, third difference, and fourth difference.

12. The method of claim 6, further comprising training, by a network impact application, a predictive model based on the comparing between the network impact level of the incident at the network element with the network impact level of performing the first reset at the network element.

13. The method of claim 6, further comprising training, by the network impact application, a predictive model based on historical data describing a plurality of different comparisons between the network impact level of the incident at a plurality of different network elements with the network impact level of performing the first reset at the different network elements.

14. The method of claim 6, wherein the network impact level of performing the first reset at the network element is further based on data describing the network element, wherein the data describing the network element indicates interconnected components of the network element such that performing the first reset on one component of the network element affects other components of the network element and generates a larger network impact.

15. A communication network, comprising:
  a radio access network comprising a network element;
  one or more non-transitory memories;
  one or more processors;
  a reset application stored at the one or more non-transitory memories, which when executed by the one or more processors, causes the one or more processors to be configured to determine a reset to perform at the network element, wherein the reset is associated with a first confidence score indicating a first likelihood that the reset will resolve an incident at the network element;
  a network impact application stored at the one or more non-transitory memories, which when executed by the one or more processors, causes the one or more processors to be configured to:
    determine a reset time at which to perform the reset at the network element based on a network impact rule, wherein the network impact rule indicates an optimal time to perform the reset at the network element based on a load at the network element at various times; and
    compare a network impact level of the incident at the network element with a network impact level of performing the reset at the network element, wherein the network impact level of the incident at the network element comprises a value measuring a network impact of the incident at the network element, and wherein network impact level of performing the reset at the network element corresponds to a value measuring a network impact of performing the reset at the network element; and
  wherein the reset application further causes the one or more processors to be configured to determine a second reset to perform at the network element in an attempt to resolve the incident when the network impact level of the incident at the network element is less than the network impact level of performing the reset at the network element, wherein the second reset is associated with a second confidence score indicating a second likelihood that the second reset will resolve the incident at the network element.

16. The communication network of claim 15, wherein, to determine the network impact level of the incident at the network element, the network impact application further causes the one or more processors to be configured to perform at least one of the following:
  determine a first difference between a performance metric at the network element before the incident and the performance metric at the network element after the incident, wherein the performance metric is associated with at least one of a throughput at the network element, a latency at the network element, or a packet loss at the network element;
  determine a second difference between a reliability metric at the network element before the incident and the reliability metric at the network element after the incident, wherein the reliability metric is associated with at least one of an operational time period, mean time between failures, or mean time between recovery;
  determine a third difference between a user experience metric at the network element before the incident and the user experience metric at the network element after the incident, wherein the user experience metric is associated with a quantity of impacted users; and
  determine a fourth difference between operational metrics at the network element before the incident and the operational metrics at the network element after the incident, wherein the operational metrics are associated with at least one of resource utilization percentages, error rates in communications or operations, frequency of security incidents, or effectiveness of security controls,
  wherein the value of the network impact level of the incident at the network element is based on at least one of the first difference, second difference, third difference, and fourth difference.

17. The communication network of claim 15, wherein, to determine the network impact level of performing the reset at the network element, the network impact application further causes the one or more processors to be configured to perform at least one of the following:
  determine a first difference between a performance metric at the network element before the reset and a predicted performance metric at the network element after the reset, wherein the performance metric and the predicted performance metric are associated with at least one of a throughput at the network element, a latency at the network element, or a packet loss at the network element;
  determine a second difference between a reliability metric at the network element before the reset and a predicted reliability metric at the network element after the reset, wherein the reliability metric and the predicted reliability metric are associated with at least one of an operational time period, mean time between failures, or mean time between recovery;
  determine a third difference between a user experience metric at the network element before the reset and a predicted user experience metric at the network element after the reset, wherein the user experience metric and the predicted user experience metric associated with a quantity of impacted users; and
  determine a fourth difference between operational metrics at the network element before the reset and a predicted operational metrics at the network element after the reset, wherein the operational metrics and the predicted operational metrics are associated with at least one of resource utilization percentages, error rates in communications or operations, frequency of security incidents, or effectiveness of security controls,
  wherein the value of the network impact level of the incident at the network element is based on at least one of the first difference, second difference, third difference, and fourth difference.

18. The communication network of claim 15, wherein the network impact application further causes the one or more processors to be configured to train a predictive model based on historical data describing a plurality of different comparisons between the network impact level of the incident at a plurality of different network elements with the network impact level of performing the reset at the different network elements.

19. The communication network of claim 15, wherein the first confidence score is greater than the second confidence score.

20. The communication network of claim 15, wherein the network impact level of performing the reset at the network element is further based on data describing the network element, wherein the data describing the network element indicates interconnected components of the network element such that performing the reset on one component of the network element affects other components of the network element and generates a larger network impact.

\* \* \* \* \*